(12) United States Patent
Furuta

(10) Patent No.: US 6,810,085 B2
(45) Date of Patent: Oct. 26, 2004

(54) MPEG VIDEO ELEMENTARY STREAM EXTRUCTION DEVICE AND ELEMENTARY STREAM EXTRUCTION METHOD USED FOR THE SAME

(75) Inventor: Yuji Furuta, Tokyo (JP)

(73) Assignee: NEC Corporation, Tokyo (JP)

( * ) Notice: Subject to any disclaimer, the term of this patent is extended or adjusted under 35 U.S.C. 154(b) by 603 days.

(21) Appl. No.: 09/867,430

(22) Filed: May 31, 2001

(65) Prior Publication Data
US 2001/0048722 A1 Dec. 6, 2001

(30) Foreign Application Priority Data
May 31, 2000 (JP) ........................................ 2000-161356

(51) Int. Cl.[7] .............................................. H04N 7/12
(52) U.S. Cl. ................................................. 375/240.28
(58) Field of Search ................................. 375/240, 240.28, 375/240.27; 348/384.1, 423.1; 370/468, 464, 516; H04N 7/12

(56) References Cited

U.S. PATENT DOCUMENTS

| | | | | |
|---|---|---|---|---|
| 5,640,388 A | * | 6/1997 | Woodhead et al. | 370/468 |
| 5,917,461 A | * | 6/1999 | Sakami et al. | 345/29 |
| 5,920,572 A | | 7/1999 | Washington et al. | |
| 6,028,932 A | * | 2/2000 | Park | 380/203 |
| 6,061,399 A | * | 5/2000 | Lyons et al. | 375/240 |
| 6,211,800 B1 | * | 4/2001 | Yanagihara et al. | 341/50 |
| 6,567,409 B1 | * | 5/2003 | Tozaki et al. | 370/395.64 |

FOREIGN PATENT DOCUMENTS

| | | |
|---|---|---|
| EP | 0 833 514 A2 | 4/1998 |
| WO | 97/28652 | 8/1997 |

OTHER PUBLICATIONS

Anthony J. Wasilewski, "The MPEG-2 Systems Specification: A Common Transport for the Digital Highway," Annual Review of Communications, National Engineering Consortium, V. 50, 1997, pp. 785–795.

P.A. Sarginson, "MPEG-2: A Tutorial Introduction to the Systems Layer," IEE Colloquim on MPEG What It Is and What It Isn't, IEEE, 1995, pp. 4–1 through 4–13.

* cited by examiner

Primary Examiner—Nhon Diep
(74) Attorney, Agent, or Firm—Young & Thompson

(57) ABSTRACT

A data storage, storing input MPEG data for a period corresponding to three clocks, is formed of the data storage (A)1, the data storage (B)2 and the data storage (C)3. The synchronous byte detector 4 detects a synchronous byte (47h) at the time of inputting TS. The TS header processor 5 processes a TS header at the time of inputting TS. The PS header processor 6 processes a PS header at the time of inputting PS. The PES data processor 7 processes PES data containing TS and PS.

10 Claims, 13 Drawing Sheets

MPEG VIDEO ELEMENTARY STREAM EXTRUCTION DEVICE AND ELEMENTARY STREAM EXTRUCTION METHOD USED FOR THE SAME

BACKGROUND OF THE INVENTION

The present invention relates to a device and method for extracting a MPEG video elementary stream. Particularly, the present invention relates to a circuit that extracts an ES (Elementary Stream) from a PS (Program Stream) and extracts an ES (Elementary Stream) from TS (Transport Program).

MPEG (Moving Picture Experts Group) system stream includes streams of two types: a PS (program stream) of the scheme of multiplexing one program (movie and program) to basic packets and transmitting in a time division mode and a TS (transport stream) of the multiplexing/separating scheme compatible with multi-programs.

The system, such as an electronic watermark inserter/detector, handling image information compressed as a MPEG stream requires to extract V-ES (Video-Elementary Stream) being data including TS/PS.

There is the so-called DEMUX as a circuit of extracting ES from PS or TS. The DEMUX circuit includes the PS input circuit and the TS input circuit, separately, or the PS processor and the TS processor, separately. These circuits are selectively used.

In the system, for example, inputting TS and outputting V-ES, the conventional DEMUX circuit outputs only the V-ES but discards all or part of other data sets.

In the conventional circuit that extracts ES from PS or TS, when the PS input circuit and the TS input circuit are selectively used, it is required to previously supply information about TS or PS to the switching circuit.

Moreover, in the data internally discarding process, the TS stream is reformed to the original TS stream by combining V-ES with other data.

SUMMARY OF THE INVENTION

The present invention is made to solve the above-mentioned problems.

An object of the present invention is to provide a MPEG video elementary stream extractor that once extracts a video stream and then changes part of the video stream data, whereby the changed data can be easily returned into the original stream structure. Another object of the present invention is to provide a MPEG video elementary stream extraction method used for the above-mentioned extractor.

In a MPEG (Moving Picture Experts Group) video elementary stream extractor according to the present invention, an elementary stream, or data, is extracted from a program stream or a transport stream. The program stream complies with the scheme of multiplexing one program into basic packets and then transmitting the basic packets in a time division mode. The transport stream complies with a multiplex/separation scheme compatible with a multi-program. The extractor comprises a decider for deciding that an input stream is the program stream or the transport stream, and means for allowing the elementary stream to be extracted based on a decision result of the decider.

In a MPEG (Moving Picture Experts Group) video elementary stream extracting method according to the present invention, an elementary stream, or data, is extracted from a program stream or a transport stream. The program stream complies with the scheme of multiplexing one program into basic packets and then transmitting the basic packets in a time division mode. The transport stream complies with a multiplex/separation scheme compatible with a multi-program. The method comprises the steps of deciding that a stream is the program stream or the transport stream; and allowing the elementary stream to be extracted based on a decision result.

That is, the MPEG video element stream extractor, according to the present invention, automatically determines TS or PS to be input and can correctly extract ES.

In a TS, a stream such as PAT (Program Association Table) or CAT (Conditional Access Table) is transmitted in addition to a V-ES. Hence, generally, in order to certainly extract a V-ES contained in a TS, the extraction circuit externally specifies and extracts a PID (Packet Identification) containing a V-ES. In contrast, according to the present invention, a PID containing a V-ES is detected and extracted automatically. The system that separately supplies position information of a leading synchronous byte of the TS stream is generally used. According to the present invention, the synchronous byte detector solves such a problem.

The electronic watermark inserter varies part of a MPEG stream to print information and then outputs the stream in conformity with the original TS or PS stream specification. However, the method of discarding data other than V-ES, such as the conventional DEMUX process, cannot extract the stream.

According to the present invention, an input stream is output as an output stream without any change while one-bit signal is added to the output stream. The level of the one-bit signal represents that data in a current output mode is a V-ES or a stream other than the V-ES. A clock synchronous circuit implements the above-mentioned operation. The clock synchronous circuit always produces data with a delay for three clocks while implementing the above-mentioned operation.

The clock synchronous circuit automatically determines the type of TS or PS. The clock synchronous circuit outputs the signal representing a portion of a V-ES while the whole of the stream is being output. The present invention has the configuration that outputs the input stream without any change. Hence, the system can be easily realized that once extracts the video stream, changes part of video stream data, and thus recovers it to the original stream structure.

BRIEF DESCRIPTION OF THE DRAWING

This and other objects, features and advantages of the present invention will become more apparent upon a reading of the following detailed description and drawings, in which.

DESCRIPTION OF THE EMBODIMENTS

Figure 1:
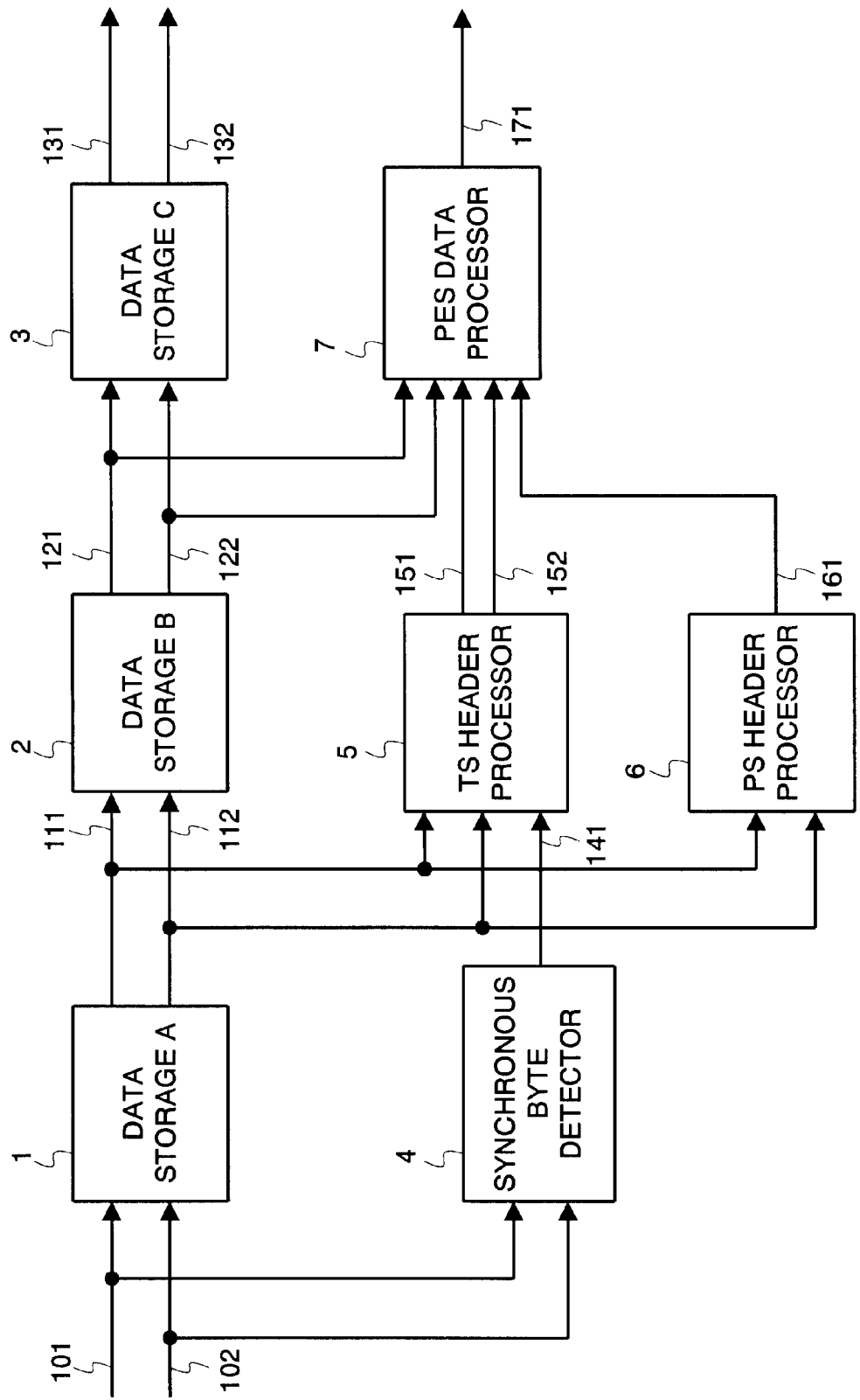
FIG. 1 is a block diagram illustrating the configuration of a MPEG video elementary stream extractor according to an embodiment of the present invention.

Next, an embodiment of the present invention will be described below by referring to the attached drawings. FIG. 1 is a block diagram illustrating the configuration of a MPEG (Moving Picture Experts Group) video elementary stream extractor according to an embodiment of the present invention. Referring to FIG. 1, the extractor includes a data storage (A)1, a data storage (B)2, and a data storage (C)3, forming a data storage for MPEG data for a time period corresponding to three clocks.

The extractor further includes a synchronous byte detector 4, a TS header processor 5, a PS header processor 6, and a PES data processor 7. The synchronous byte detector 4 detects a synchronous byte (47h) at the time of inputting a TS (Transport Stream). The TS header processor 5 processes a TS header at the time of inputting a TS. The PS header processor 6 processes a PS header at the inputting of a PS (Program Stream). The PES data processor 7 processes PES (Packetized Elementary Stream) data contained in TS and PS.

The operation of the data storage according to an embodiment of the present invention will be described below by referring to FIG. 1. An input signal MPEG stream data input enable 102 with a width of 8 bits is input to the data storage (A)1. MPEG stream data 101 changes in sync with system clocks (not shown). The MPEG stream data input enable 102 indicates whether or not the MPEG stream data 101 is effective with the current clocks.

The data storage (A)1 is formed of nine flip-flops (referred to as F/Fs, hereinafter). Eight F/Fs hold the MPEG stream data 101 in sync with clocks and output it as the data storage (A) data output 111. The remaining F/F holds the MPEG stream data input enable 102 in sync with clocks and outputs it as the storage (A) data output enable 112.

The data storage (A) data output enable 112 indicates whether or not the data storage (A) data output 111 is effective.

Each of the data storage (B)2 and the data storage (C)3 operates in a manner similar to the data storage (A)1. The data storage (C) data output enable 132 indicates whether or not the data storage (C) data output 131 is effective.

The combination of the data storage (A)1, (B)2, and (C)3 delays the MPEG stream data 101 and the MPEG stream data input enable 102 by three clocks and then outputs the data storage (C) data output 131 and the data storage (C) data enable 132.

Figure 2:
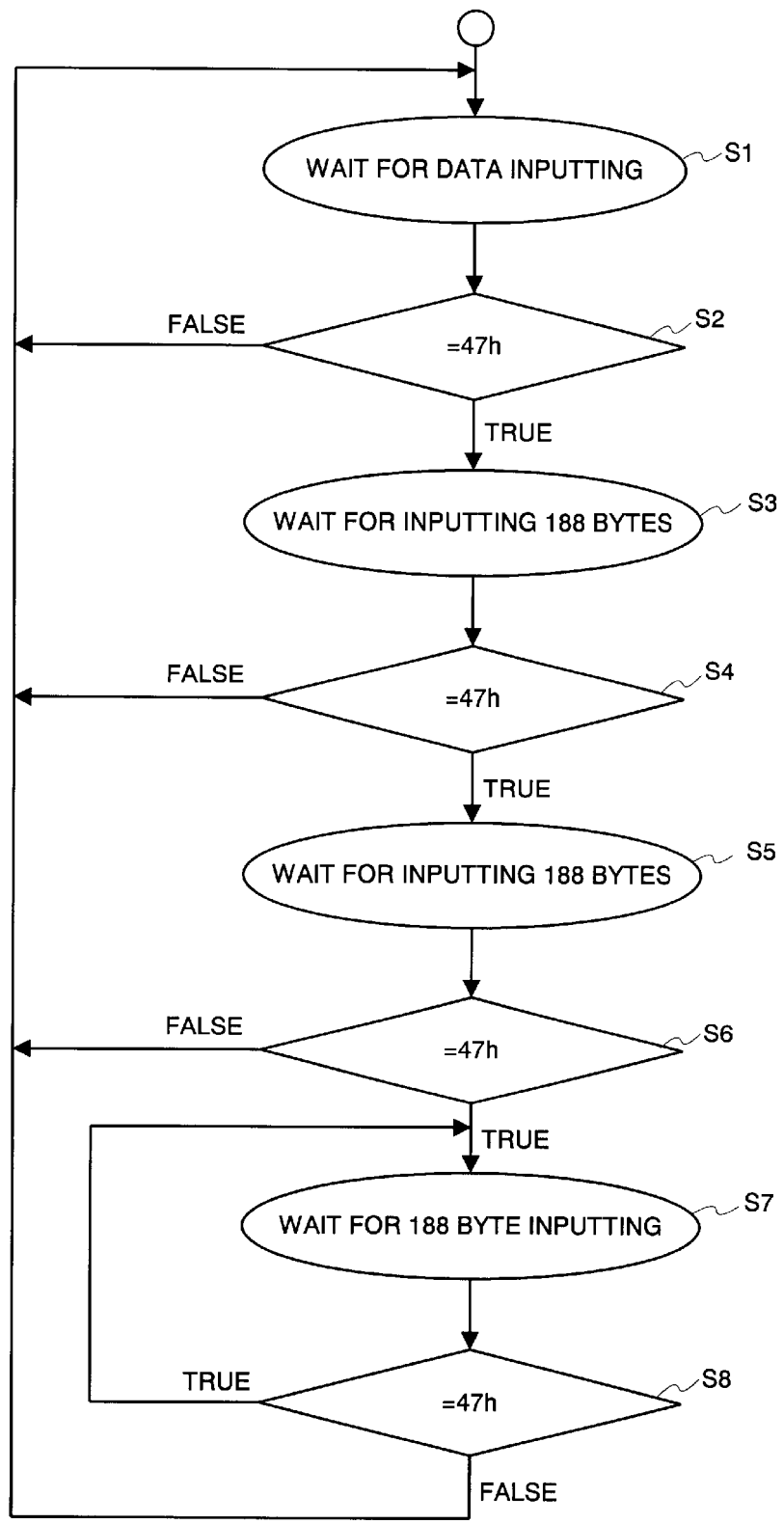
FIG. 2 is a flowchart of the internal operation of the synchronous byte detector shown in FIG. 1.

FIG. 2 is a flowchart illustrating the internal operation of the synchronous byte detector 4 shown in FIG. 1. The operation of the synchronous byte detector 4 will be explained by referring to FIG. 2. The synchronous byte detector 4 receives the MPEG stream data input enable 102 and the MPEG stream data 101 and creates a synchronous byte detection signal 141.

In the state S1 of FIG. 2, it is waited for an input enable state of the MPEG stream data input enable 102 brought. When the MPEG stream data input enable 102 becomes an enable state, it is checked whether or not the MPEG stream data 101 is 47h (indicates as 47 in hexadecimal notation), as shown in the state S2.

If the MPEG stream data 101 is not 47h, the state changes to the state S1 and waits until 47h is input. When 47h is input, the state changes the state S3 and waits until the successive data of 187 bytes is input.

When data of the $188^{th}$ byte is input, the state changes to the state S4. It is checked whether or not the MPEG stream data 101 is 47h. If the data 101 is not 47h, the state changes to the state S1. If the data 101 is 47h, the state changes to the state S5. The operation in the state S5 is similar to that in the state S3. The operation in the state S6 is similar to that in the state S4.

When data matches with 47h in the state S6, the state changes to the state S7. At this time, the synchronous byte detection signal 141 becomes active for one clock duration with the timing the data storage (A)1 outputs the synchronous byte 47h.

In the state S7, the flow changes to the state S8 every successive 188 bytes. In the state S8, whether or not the MPEG stream data 101 coincides with 47h is confirmed. If the data coincides with 47h, the synchronous byte detection signal 141 becomes active for one clock duration with the timing the data storage (A)1 outputs the synchronous byte 47h. Thereafter, the flow changes to the state S7 and the operation is continued. If the data does not coincide with 47h, the synchronous byte detection signal 141 does not become active. The flow changes to the state S1 and the above-mentioned operation is repeated.

Using that the synchronous byte (47h) appears every 188 bytes in a TS, the synchronous byte detector 4 creates a signal showing the leading portion of a TS packet (a packet of 188 bytes).

In this example, successive three synchronous bytes are detected every 188 bytes to create the synchronous detection signal 141. However, the leading portion of the TS packet may be certainly detected by repeating an increased number of detection operations. In an actual operation, the synchronous detection signal 141 is asserted. The storage (A) data output 111 is synchronized with the data storage (A) data output enable 112. The timing the data storage (A) data output 111 is 47h coincides with the timing the synchronous byte detection signal 141 is asserted.

Figure 3:
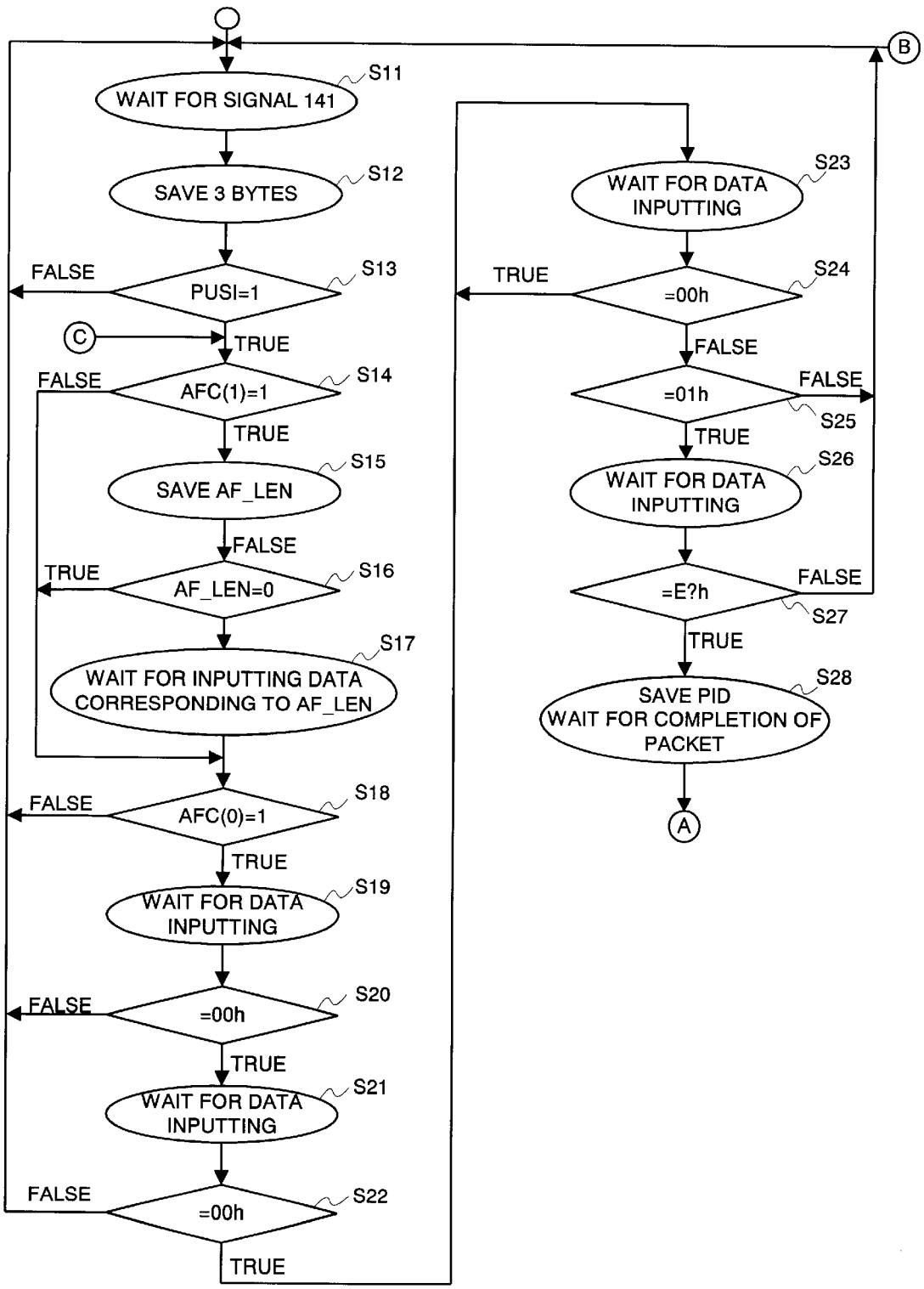
FIG. 3 is a flowchart of the internal operation of the TS header processor shown in FIG. 1.
Figure 4:
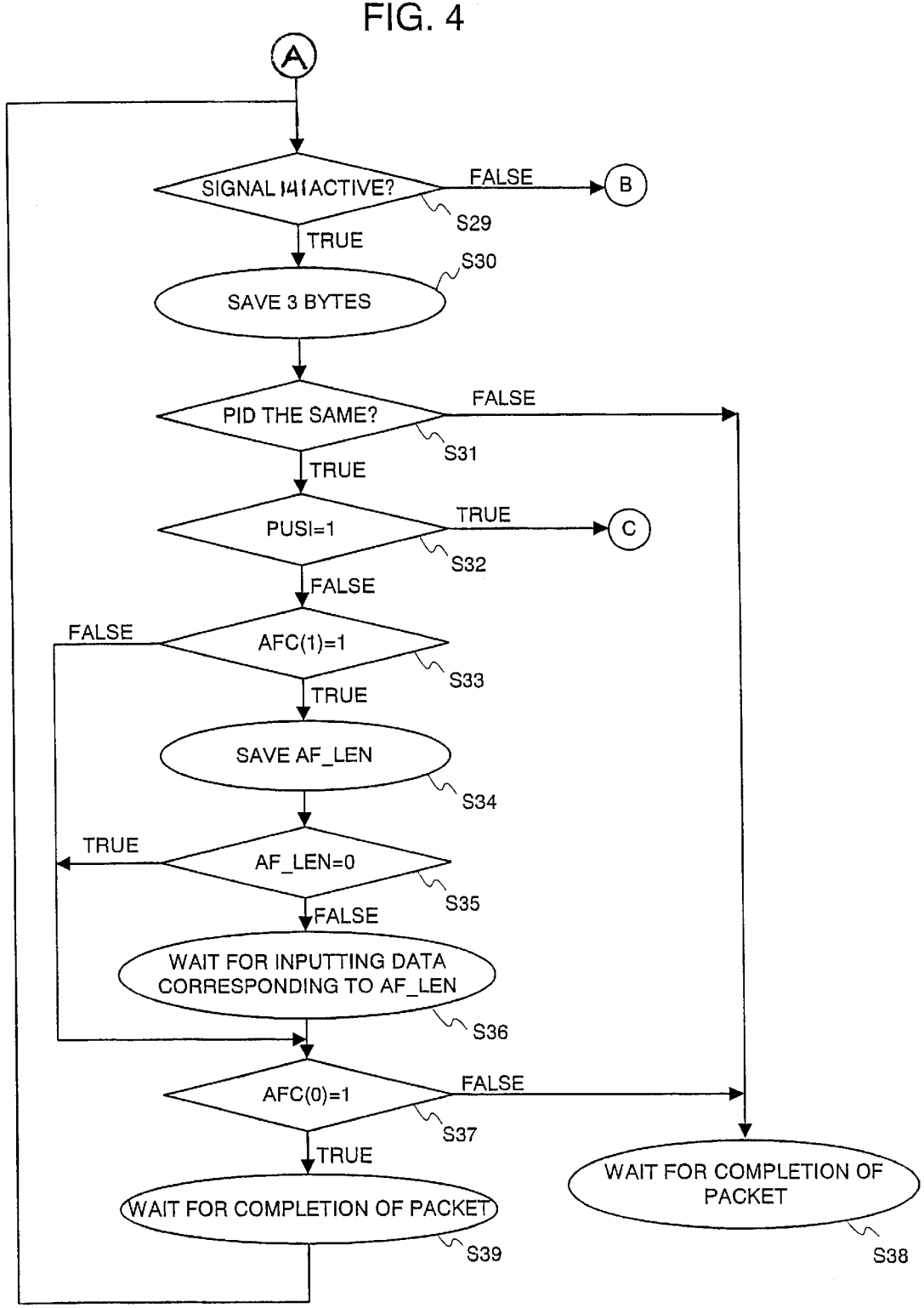
FIG. 4 is a flowchart of the internal operation of the TS header processor shown in FIG. 1.

FIGS. 3 and 4 are flowcharts illustrating the internal operation of the TS header processor 5 of FIG. 1. The operation of the TS header processor 5 will be explained below referring to FIGS. 3 and 4. The TS header processor 5 receives the data storage (A) data output 111 and the data output enable 112 from the data storage (A)1 and the synchronous byte detection signal 141 from the synchronous byte processor 4 and creates the PES header detection signal 151 and the TS data detection signal 152 in the transfer stream (TS).

In the state S11 shown in FIGS. 3 and 4, the TS header processor 5 waits for the synchronous byte detection signal 141 in an active state and the data storage (A) data output enable 112 in an enable state. When the above-mentioned condition is established, the state changes to the state S12.

In the state S12, a PUSI (Payload unit start indicator) of 1 bit and a PID of 13 bits and AFC (Adaptation Field Control) of 2 bits, defined by ISO-13818-1, are extracted from the data of 3 bytes following 47h.

At this time, by confirming continuity_counter of 4 bits of which the numeral value increases every packet, serially transmitted packets (continuity_counter of continuous packets are the same) or non-continuity of packets (the case where continuity_counter does not increment between continuously transmitted packets) is confirmed. Thus, an exceptional process such as interruption can be performed. However, in this embodiment, the explanation of this process will be omitted here. When PUSI, PID and AFC have been completely stored, the flow goes to the state S13.

Whether or not the PUSI is 1 is checked in the state S13. If PUSI is 0, the flow goes to the state S11. If PUSI is 1, the flow goes to the state S14. In the state S14, whether or not the upper one bit of 2 bits of AFC is 1 is confirmed.

When the upper bit is 0, the flow goes to the sate S18. When the upper bit is 1, the flow goes to the state S15. In the state S15, the successive data of one byte is held as AF_LEN (adaptation field_length). The flow goes to the state S16.

Whether or not AF_LEN is 0 is confirmed in the state S16. If AF_LEN is 0, the flow goes to the state S18. If AF_LEN is more than 0, the flow goes to the state S17. In the state S17, inputting the number of data represented with AF_LEN is confirmed. After data has been completely input, the flow goes to the state S18.

In the state S18, it is checked whether or not the lower bit of the two bits of AFC is 1. When the lower one bit is 0, the flow goes to the state S11. When the lower bit is 1, the flow goes to the state S19. In the state S19, the inputting of the next data is waited. When data is input, the flow, goes to the state S20.

Whether or not the input data is 00h is confirmed in the state S20. If the data is not 00h, the flow goes to the state S11. In the state S21, the inputting of the next data is waited. If the data is input, the flow goes to the state S22. In the state S22, whether or not the input data is 00h is confirmed. When data is not 00h, the flow goes to the state S11.

In the state S23, the inputting of the next data is waited. If the data is input, the flow goes to the state S24. Whether or not the input data is 00h is confirmed in the state S24. When data is 00h, the flow goes to the state S23. When the data is not 00h, the flow goes to the state S25.

Whether or not the input data is 01h is confirmed in the state S25. When data is 01h, the flow goes to the state S26. When the data is not 01h, the flow goes to the state S11.

Inputting the next data is waited in the state S26. If the data is input, the flow goes to the state S27. Whether or not the upper four bits of the input data are Eh is checked in the state S27. In this case, the lower four bits are not cared about. When the upper four bits are Eh, the flow goes to the state S28. When the upper four bits are not Eh, the flow goes to the state S11.

In the state S28, a PID stored previously and temporarily is saved into another target PID storage (not shown). In the state S28, when means (not shown) prepared separately shows the fact that 188 bytes for one packet has been completely input by the synchronous byte detection signal 141, the flow goes to the state S29. Meanwhile, the PES header detection signal 151 becomes active for the time period corresponding to one clock, with the timing data containing the previous Eh is output.

Means (not shown) additionally prepared indicates that the fact that 188 bytes for one packet has been completely input by the synchronous byte detection signal 141, with the timing data following data containing the previous Eh is output. The means makes the TS data detection signal 152 active until the moment immediately before the flow goes to the state S29.

Whether or not the synchronous detection signal 141 becomes active at the time of inputting successive data is confirmed in the state S29. When the synchronous detection signal 141 does not become active, the flow goes to the state S11 to indicate that the previous synchronous byte detector 4 has not continuously detect the synchronous byte.

Like the state S12, PUSI, PID and AFC are temporarily stored in the state S30 and the flow goes to the state S31. In the sate S31, the data in the target PID storage saved in the state S28 is compared with the PID. If data does not coincide with the PID, the flow goes to the state S38. If data coincides with the PID, the flow goes to the state S32.

When the means (not shown) additionally prepared has completely input 188 bytes for one packet from the synchronous byte detection signal 141 in the state S38, the flow goes to the state S29.

Like the state S13, PUSI is confirmed in the state S32. When PUSI is 1, the flow goes to the state S14. When PUSI is 0, the flow goes to the state S33. A process similar to that in the state S14 is performed in the state S33. A process similar to those in the states S14 to S18 is performed in the states S34 to S37.

Whether or not the lower bit of the two bits of AFC is 1 is checked in the state S37. If the lower bit is 1, the flow goes to the state S39. If the lower bit is 0, the flow goes to the state S38.

In the state S39, when the means (not shown) separately prepared indicates that 188 bytes for one packet from the synchronous byte detection signal 141 has completely input, the flow goes to the state S29.

The TS header processor 5 indicates that the means (prepared separately) has completely input 188 bytes for one packet from the synchronous byte detection signal 141, and makes the TS data detection signal 152 active until the moment immediately before the flow goes to the state S29. Thus, the PES header detection signal 151 in the TS is made active with the timing in which Exh of 00h, 00h, 01h, and Exh (where x is 0h to Fh) is output.

The TS data detection signal 152 is made active in the section, except the TS header and AF, from the data following 00h, 00h, 01h, and Exh (where x is 0h to Fh). In an actual operation, both the PES header detection signal 151 and the TS data detection signal 152 of the TS synchronize with the data storage (B) data output 121 and with the data storage (B) data output enable 122.

Figure 5:
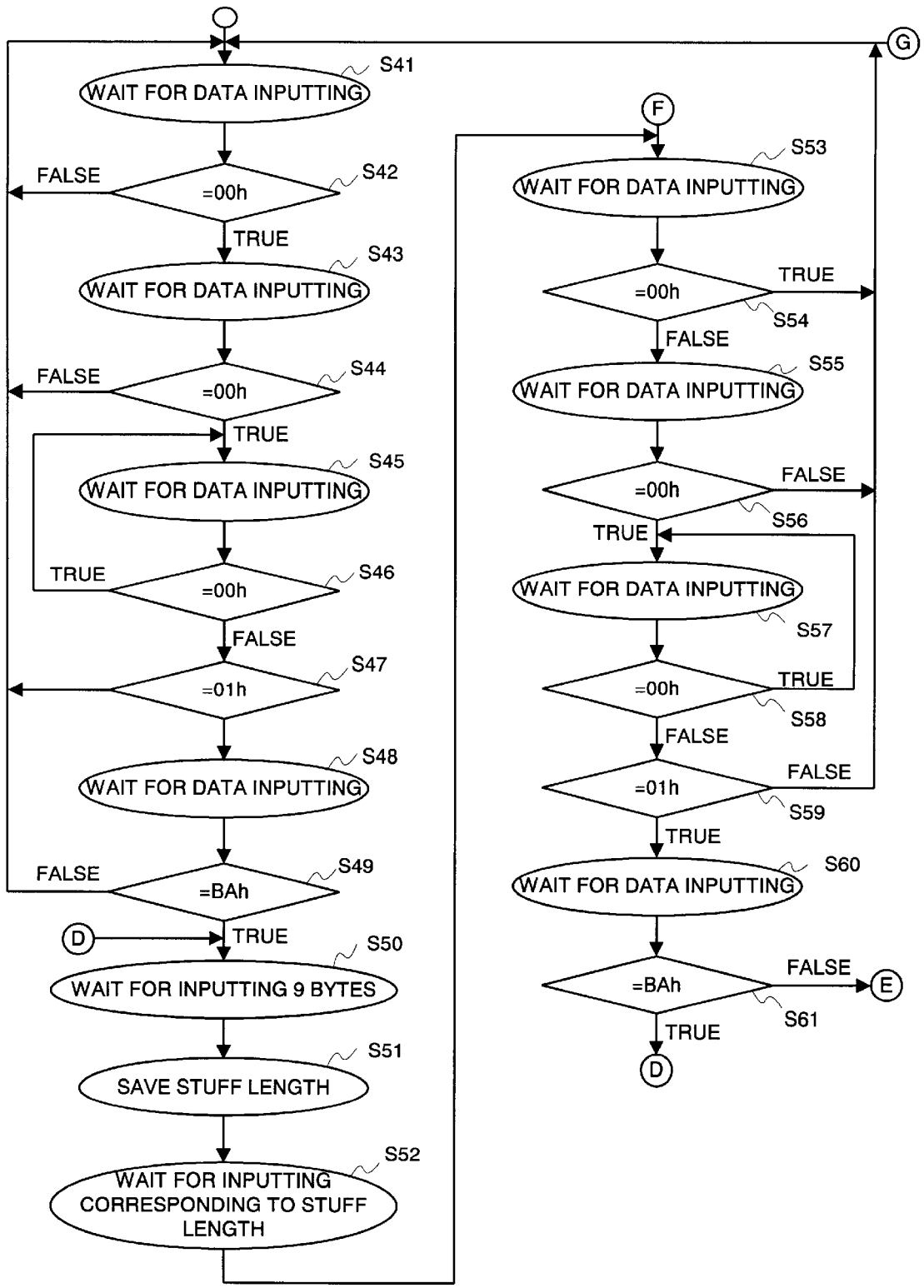
FIG. 5 is a flowchart of the internal operation of the PS header processor shown in FIG. 1.
Figure 6:
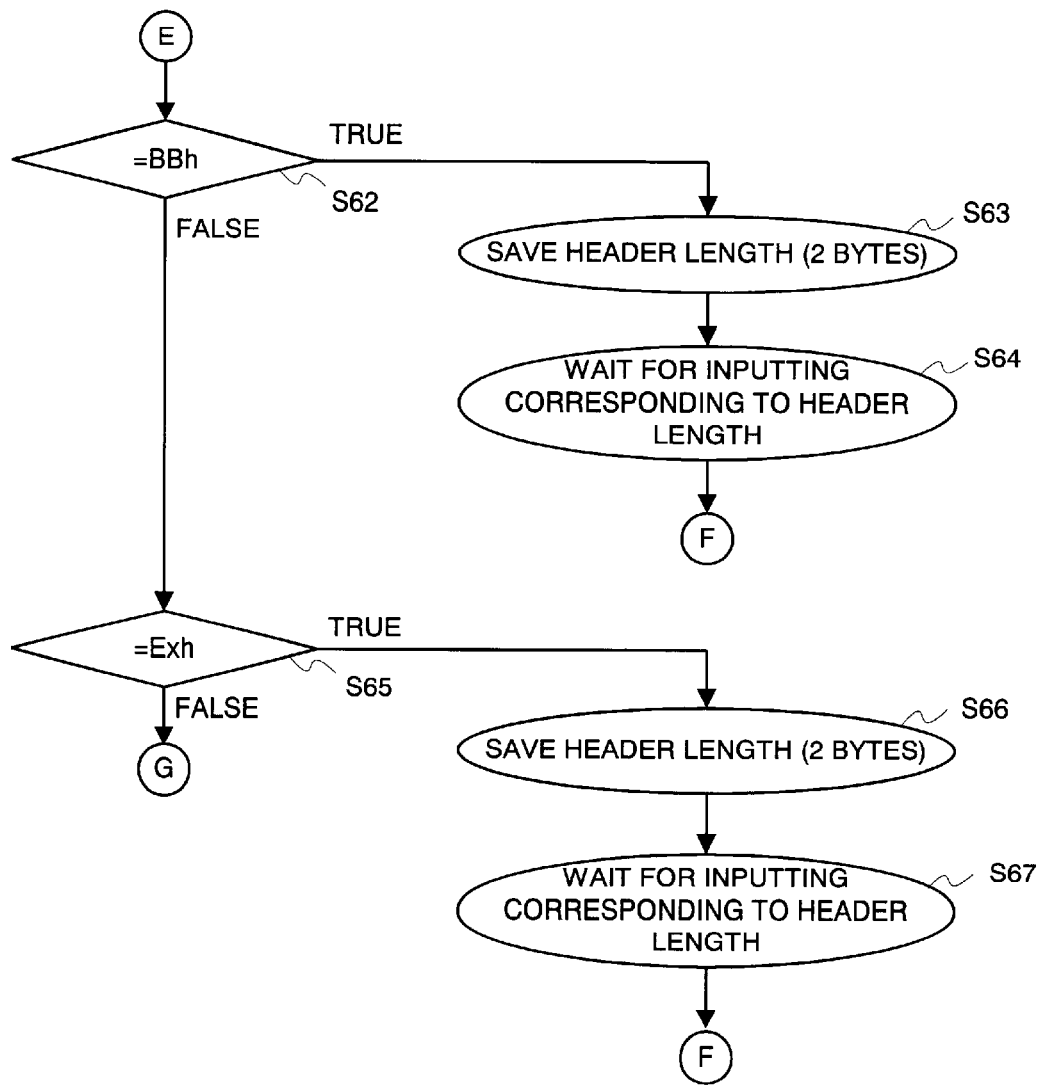
FIG. 6 is a flowchart of the internal operation of the PS header processor shown in FIG. 1.

FIGS. 5 and 6 are flowcharts illustrating the internal operation of the PS header processor 6 of FIG. 1. The operation of the PS header processor 6 will be described by referring to FIGS. 5 and 6. The PS header processor 6 receives the data storage (A) data output 111 and the data storage (A) data output enable 112, output from the data storage (A)1, and creates the PES header detection signal 161 in the PS from them.

In this embodiment, the PS header processor 6 receives the data storage (A) data output 111 and the data storage (A) data output enable 112, output from the data storage (A)1. However, the circuit that creates the PES header detection signal 161 of a PS, using MPEG stream data input enable 102 and the MPEG stream data 101, and delays the stream by one clock may be arranged at the rear stage to supply its output to the PES processor 7.

In the state S41 of FIGS. 5 and 6, the data storage (A) data output enable 112 becomes an enabling state in the state S41. Then, the inputting of data is waited. When data is input, the flow goes to the state S42. In the state S42, if the data storage (A) data output 111 (or input data) is not 00h, the flow goes to the state S41. If the input data is 00h, the flow goes to the state S43.

The inputting of data is waited in the state S43. When data is input, the flow goes to the state S44. If the input data is not 00h in the state S44, the flow goes to the state S41. If the input data is 00h, the flow goes to the state S45. The inputting of data is waited in the state S45. When the data is input, the flow goes to the state S46.

If the input data is not 00h in the state S46, the flow goes to the state S47. If the input data is 00h, the flow goes to the state S45. If the input data is not 01h in the state S47, the flow goes to the state S41. If the input data is 01h, the flow goes to the state S48.

The inputting of data is waited in the state S48. When the data is input, the flow goes to the state S49. When the input data is not BAh in the state S49, the flow goes to the state S41. When the input data is BAh, the flow goes to the state S50. The inputting of data corresponding to 9 bytes is waited in the state S50. When the data is input, the flow goes to the state S51.

The inputting of data is waited in the state S51. When the data is input, the flow goes to the state S52 while Stuff Length (pack stuffing length) is saved. The inputting of data corresponding to Stuff Length is waited in the state S53. The flow goes to the state S53. At this time, if Stuff Length is 0, the flow goes to the state S53 without waiting data inputting.

The inputting of data is waited in the state S53. When the data is input, the flow goes to the state S54. When the input data is not 00h in the state S54, the flow goes to the state S41. When the input data is 00h, the flow goes to the state S55.

The inputting of data is waited in the state S55. When the data is input, the flow goes to the state S56. When the input data is not 00h in the state S56, the flow goes to the state S41. When the input data is 00h, the flow goes to the state S57.

The inputting of the data is waited in the state S57. When the data is input, the flow goes to the state S58. When the input data is not 00h in the state S58, the flow goes to the state S59. When the input data is 00h, the flow goes to the state S57.

When the input data is not 01h in the state S59, the flow goes to the state S41. When the input data is 01h, the flow goes to the state S60. The inputting of data is waited in the state S60. When data is input, the flow goes to the state S61.

If the input data is not BAh in the state S61, the flow goes to the state S62. When the input data is BAh, the flow goes to the state S50. When the input data is not BBh in the state S62, the flow goes to the sate S65. If the input data is BBh, the flow goes to the state S63.

Whether or not the upper four bits of the input data is Eh is confirmed in the state S65. If the upper four bits represent Eh, the flow goes to the state S66. The PES header detection signal 161 in the PS is made active for one clock, with the timing in which Eh is output. If the upper four bits does not represent Eh, the flow goes to the state S41.

The inputting of 2-byte data is waited in the state S63. After the data is stored as Header Length, the flow goes to the state S64. The inputting of data corresponding to Header Length is waited in the state S64. Thereafter, the flow goes to the state S53.

The inputting of 2-byte data is waited in the state S66. After the data is saved as Header Length, the flow goes to the state S67. The inputting of data corresponding to Header Length is waited in the state S67. Thereafter, the flow goes to the state S53.

In such an operation, the PES header detection signal 161 in the PS is made active for one clock, with the timing in which Exh of 00h, 00h, 01h, Exh (where x is 0h to Fh) is output.

In an actual operation, the PES header detection signal 161 in PS synchronizes with the data storage (B) data output 121 and the data storage (B) data output enable 122. The data storage (B) data output 121 is asserted with the timing in which Exh is output.

Figure 7:
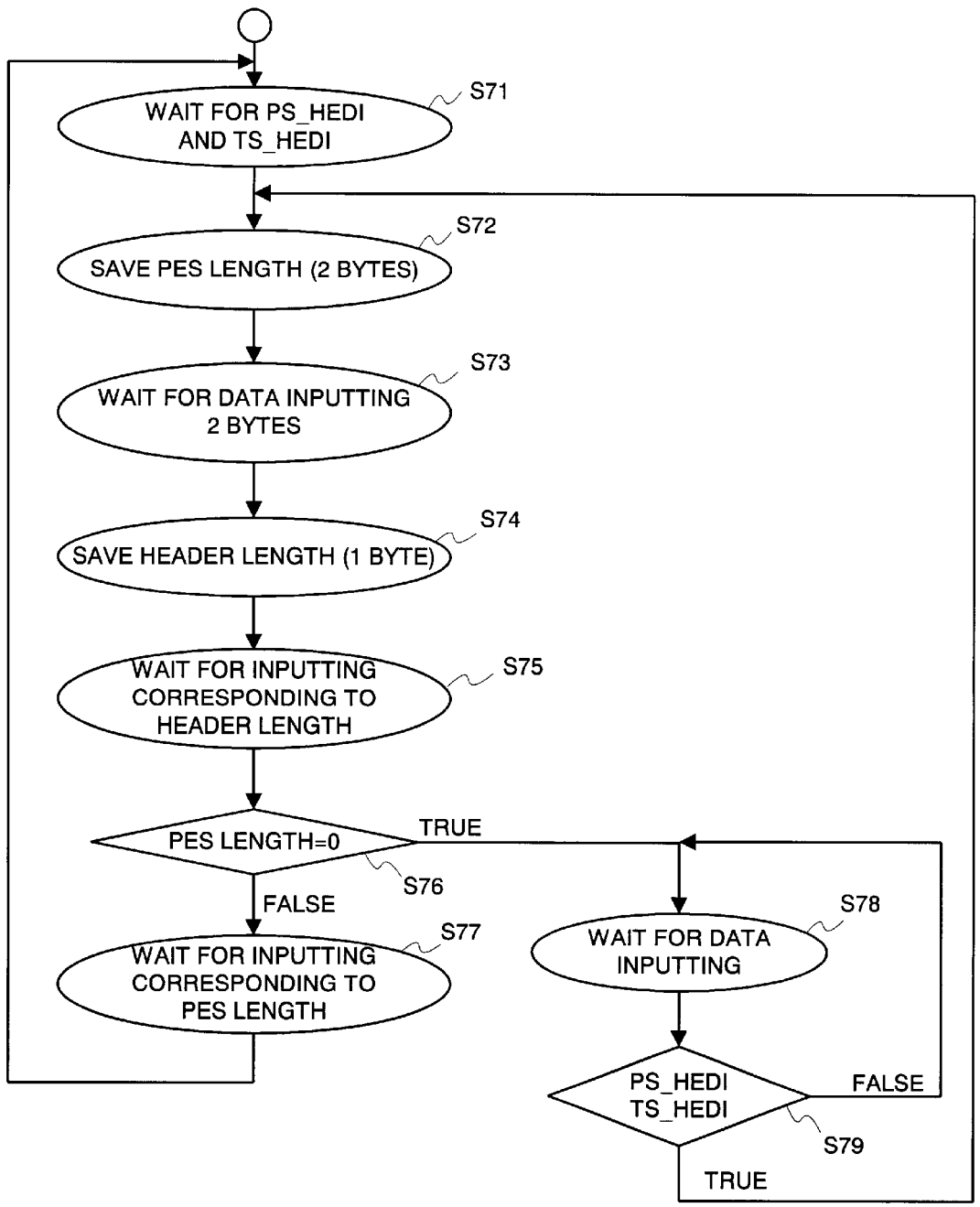
FIG. 7 is a flowchart of the internal operation of the PES data processor shown in FIG. 1.

FIG. 7 is a flowchart illustrating the internal operation of the PES data processor in FIG. 1. The operation of the PES data processor 7 will be described below by referring to FIG. 7. The PES data processor 7 receives the data storage (B) data output 121 and the data storage (B) data output enable 122, output from the data storage (B)2, and then creates the ES data detection signal 171 in the PES from them.

Referring to FIG. 7, a change to an active state of the PES header detection signal 151 in the TS header or the PES header detection signal 161 in the PS header is waited in the state S71. When either one of the PES header detection signals 151 and 161 becomes active, the flow goes to the state S72. At this time, a transition to activation of the PES header detection signal 151 in the TS header is saved in the TS head flag (not shown).

At this time, data of Exh (where x is 0h to Fh) is input. X section is called Stream ID representing the type of stream. When the Stream ID is saved and the flow is changed from the state S71 to the state S72 in the following steps, the previously saved Stream ID is compared with the current Stream ID. If no coincidence, the flow is not go to the state S72. Data in which Video ES is multiplexed can be processed with the PES layer.

The inputting of 2-byte data is waited in the state S72. The content is saved as PES Packet Length. Then the flow goes to the state S73. In the states S72 to 75, the TS header flag determines the inputting of the TS header with a different timing. With the TS header flag indicating that the PES header detection signal 151 in the TS header is in an active state, an active state of the data storage (B) data output enable 122 and the TS data detection signal 152 is recognized as the inputting of data. With the TS header flag not indicating that the PES header detection signal 151 in the TS header is in an active state, an active state of the data storage (B) data output enable 122 is recognized as the inputting of data.

The inputting of 2-byte data is waited in the state S73. The flow goes to the state S74. The inputting of data is waited in the state S74. The data is saved as PES Header length and the flow goes to the state S75. The inputting of data corresponding to PES Header Length is waited in the state S75. The flow goes to the state S76.

Whether or not PES Packet Length saved in the state S72 is 0 is determined in the state S76. When PES Packet Length is not 0, the flow goes to the state S78. When PES Packet Length is 0, the flow goes to the state S77.

The inputting of data is waited in the state S77. The ES data detection signal 171 in a PES is made active. This means that the data input in the state S77 activates the ES data detection signal 171 in the PES, with the timing in which the data storage (C) data output 131 is output and in synchronous with the data storage (C) output enable 132. While data remains in the state S77, the same process is repeated.

Whether or not data corresponding to PES Packet Length has input is confirmed in the state S77. When data corresponding to PES packet Length is not input, the process left in the state S77 is continued. When data corresponding to PES Packet Length is input, the flow goes to the state S71.

At this time, since the PES Packet Length contains the number of data processed in the states S73 to S75, the number of data is subtracted. Thus, it is confirmed that data corresponding to PES Packet Length has input.

The inputting of data is waited in the state S78. Whether or not the TS data detection signal 152 is in an active is confirmed. When the TS data detection signal 152 is in an active state, the ES data detection signal 171 in the RES is made active. This means that data input in the state S78 for one byte activates the data output enabling data 132 in the PES, with the timing in which the data storage (C) data output enable 131 is output and in synchronous with the data storage (C) data output enable 132. Thereafter, the flow goes to the state S79.

When either the PES header detection signal 151 in the TS header or the PES header detection signal 161 in the PS header is in an active state, the flow goes to the state S72. When each of the signals 151 and 161 is not in an active state, the flow returns to the state S78. Thus, the process is continued.

When the flow goes to the state S72 due to activation of the PES header detection signal 151 in the TS header, the TS header flag (means (not shown)) saves the transition. When transition occurs due to activation of the PES header detection signal 161 in the PS header, the TS header flag is cleared.

The above-described configuration automatically determines types of TS and PS and outputs the signal representing whether or not is part of a video elementary stream while the whole of the stream is being output. Hence, the system can be easily realized that changes part of the video stream data after the video stream is once extracted, thus reconstructing the original stream structure.

Figure 8:
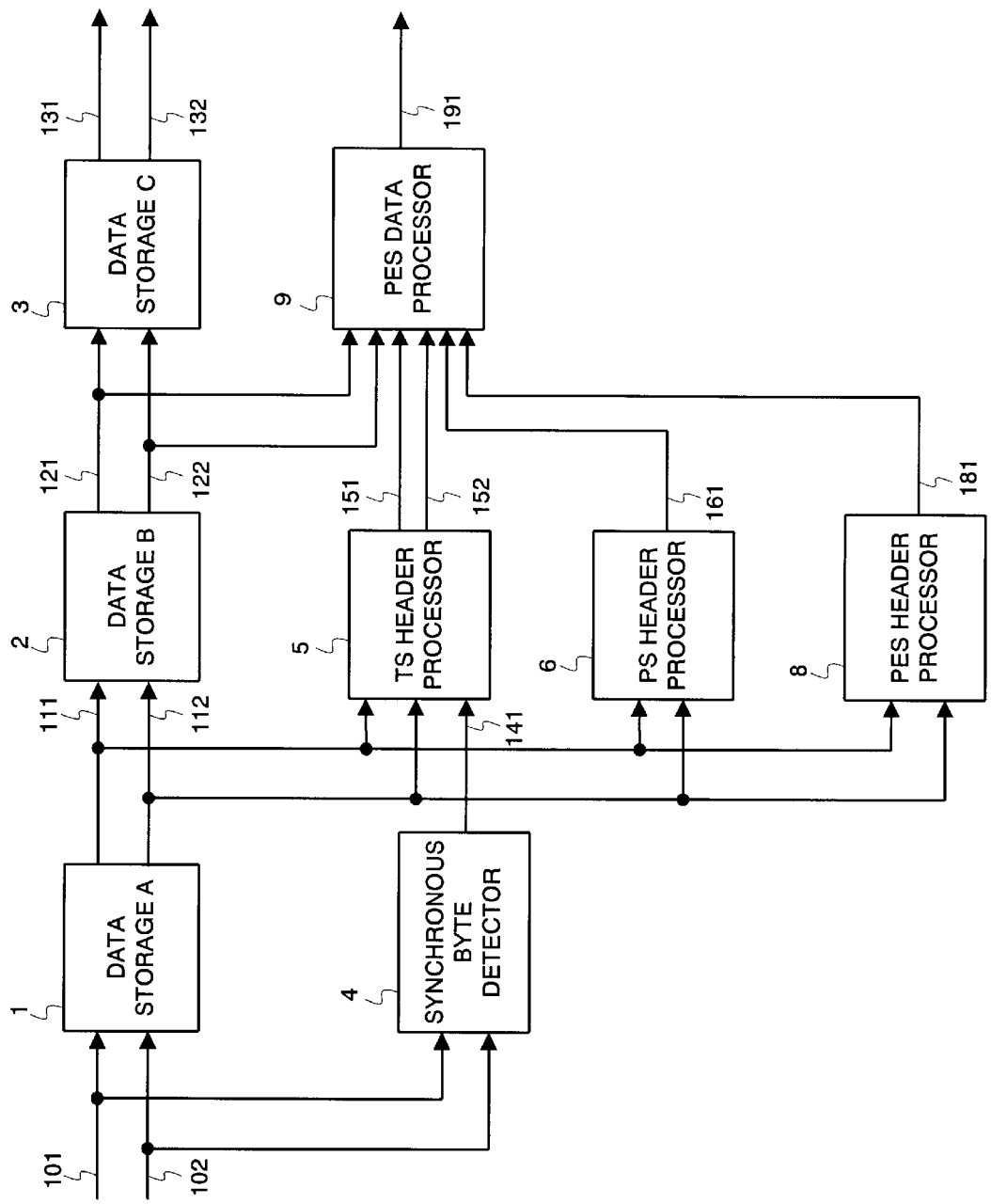
FIG. 8 is a block diagram illustrating the configuration of a MPEG video elementary stream extractor according to another embodiment of the present invention.

FIG. 8 is a block diagram illustrating the configuration of a MPEG video elementary stream extractor according to another embodiment of the present invention. Referring to FIG. 8, this embodiment differs from the embodiment of FIG. 1 in that the PES header processor 8 is added to extract a V-ES from PES. Like numerals are added to the same constituent elements as those in the first embodiment of the present invention. The same constituent elements operate similarly to those in the first embodiment of the invention.

In the previous embodiment of the present invention, the input data is limited to TS or PS. However, the present embodiment has the function of extracting a V-ES from a PES, in addition to the feature of the previous embodiment. The PES header processor 8 is newly added that creates a PES header detection signal 181 in a PES. The PES data processor 9 has the function of receiving the PES header detection signal 181 in the PES, in addition to the function of the PES data processor 7. Like the ES data detection signal 171 in the PES, the ES data detection signal 191 in the PES represents whether or not data output from the data storage (C)3 resides in the V-ES.

Figure 9:
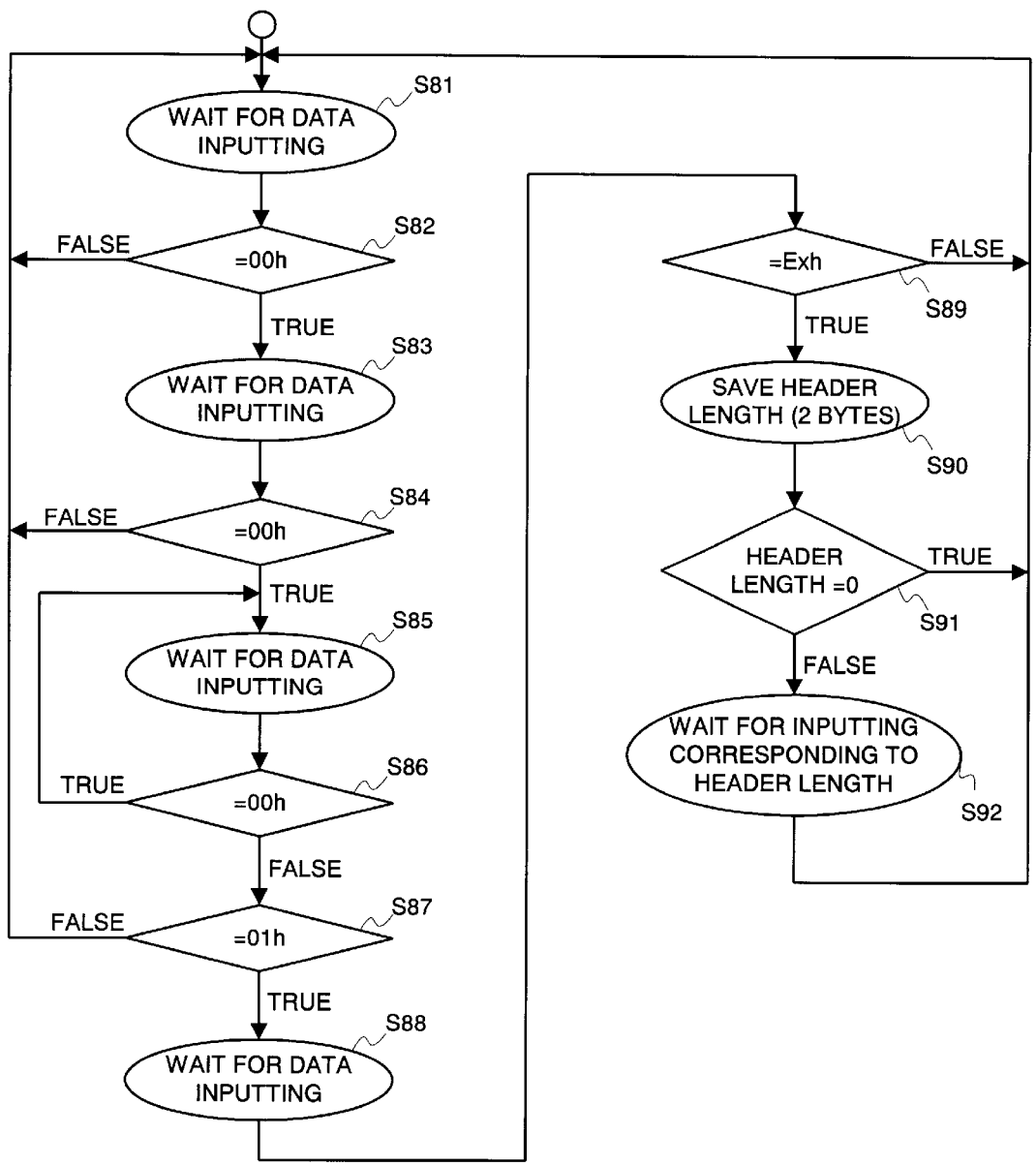
FIG. 9 is a flowchart of the internal operation of the PES header processor shown in FIG. 8.

FIG. 9 is a flowchart of the internal operation of the PES header processor shown in FIG. 8. The operation of the PES header processor 8 will be explained below by referring to FIG. 8. The PES header processor 8 receives the data storage (A) data output 111 and the data storage (A) data output enable 112, output from the data storage (A)1, and creates a PES header detection signal 181 in the PES from them.

In the embodiment, the PES header processor 8 receives the data storage (A) data output 111 and the data storage (A) data output enable 112, output from the data storage (A)1. This operation can be realized by the circuit that creates the PES header detection signal 181 in the PES, delaying it by one clock, with the MPEG stream data input enable 102 and with the MPEG stream data 101, and then supplies it to the PES data processor 9.

Referring to FIG. 9, the inputting of data is waited in the state S81. When the data is input, the flow goes to the state S82. If the input data is not 00h in the state S82, the flow goes to the state S81. When the input data is 00h, the flow goes to the state S83.

The inputting of data is waited in the state S83. When the data is input, the flow goes to the state S84. If the input data is not 00h in the state S84, the flow goes to the state S81. When the input data is 00h, the flow goes to the state S85.

The inputting of data is waited in the state S85. When the data is input, the flow goes to the state S86. If the input data is not 00h in the state S86, the flow goes to the state S87. When the input data is 00h, the flow goes to the state S85. If the input data is not 01h in the state S87, the flow goes to the state S81. When the input data is 01h, the flow goes to the state S88.

The inputting of data is waited in the state S88. When data is input, the flow goes to the state S89. Whether or not the upper four bits of the input data is Eh in the state S89 is confirmed. If the upper four bits correspond to Eh, the flow goes to the state S90. The PES header detection signal 181 in the PES is activated for one clock, with the timing in which Eh is output. If the upper four bits are not Eh, the flow goes to the state S81.

The inputting of 2-byte data is waited in the state S90. After the data is saved as Header Length, the flow goes to the state S91. Whether or not Header Length is 0 is confirmed in the state S91. When Header Length is 0, the flow goes to the state S81. When the Header Length is not 0, the flow goes to the state S92. The inputting of data corresponding to Header Length is waited in the state S92. Thereafter, the flow goes to the state S81.

Figure 10:
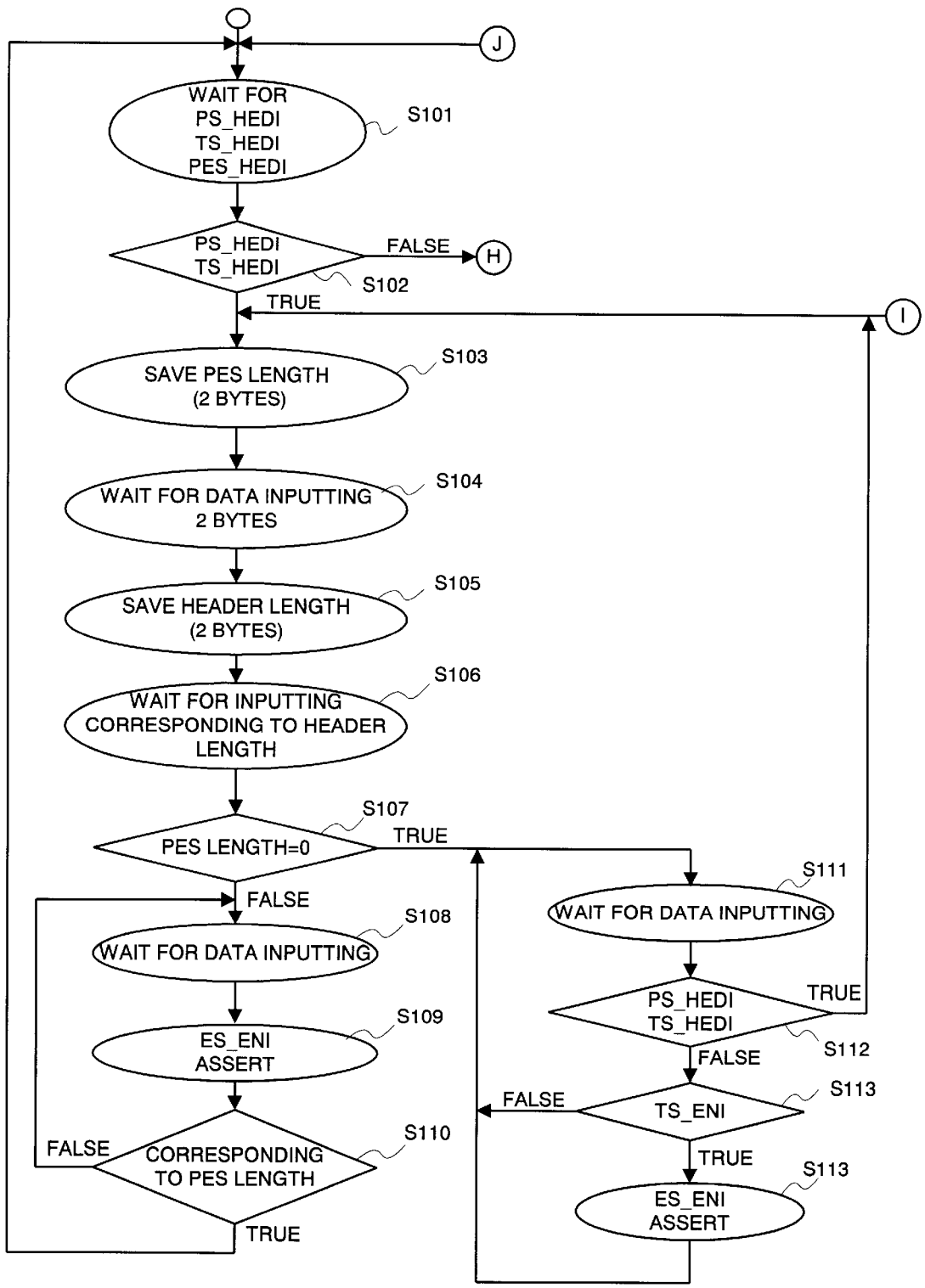
FIG. 10 is a flowchart of the internal operation of the PES data processor shown in FIG. 6.
Figure 11:
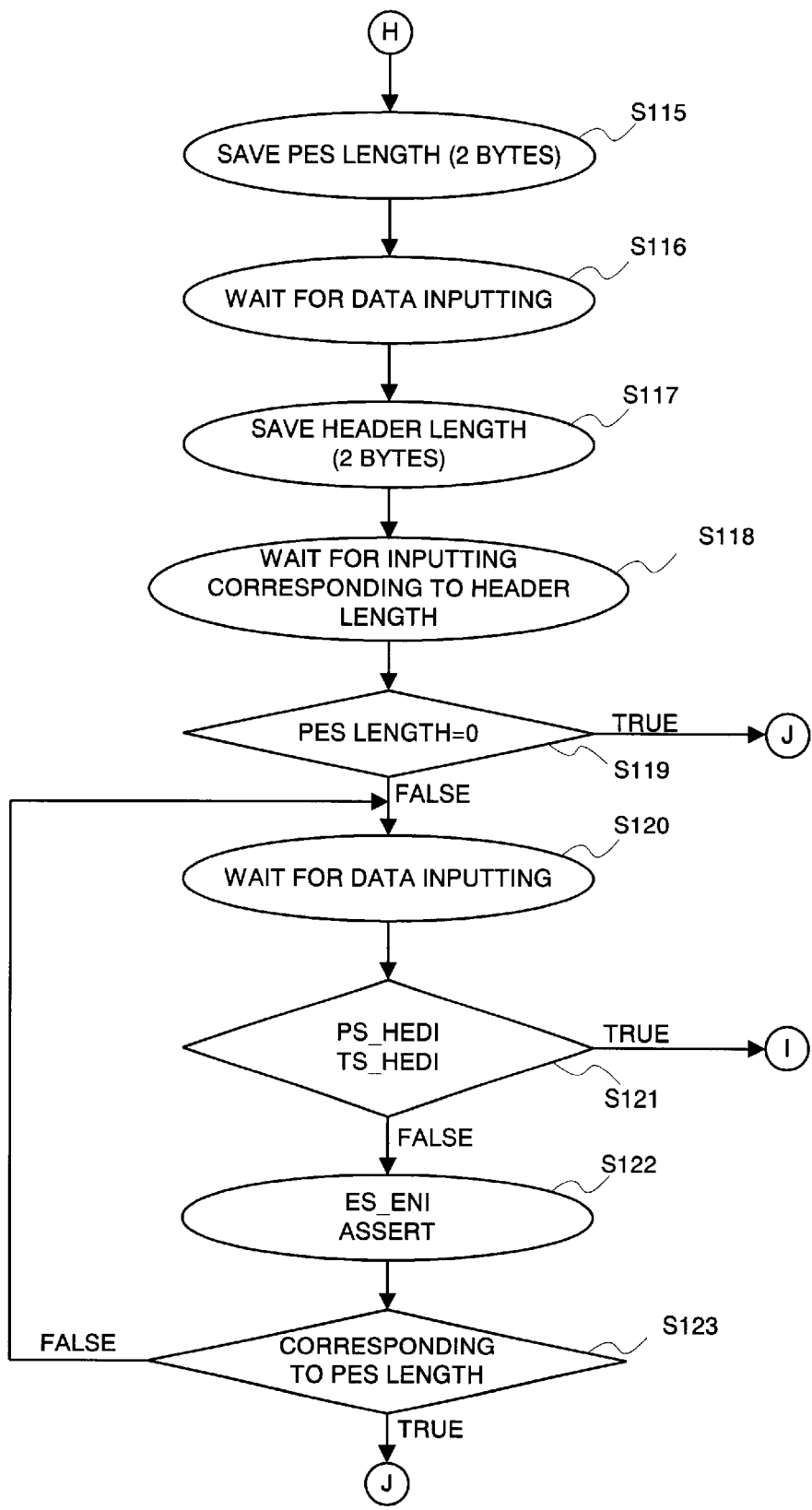
FIG. 11 is a flowchart of the internal operation of the PES data processor shown in FIG. 6.

FIGS. 10 and 11 are flow charts of the internal operation of the PES data processor 9 shown in FIG. 8. FIG. 11 is a flow chart of the internal operation of the PES data processor 9 shown in FIG. 8. The operation of the PES data processor 9 will be described below referring to FIGS. 10 and 11. The PES data processor 9 receives the data storage (B) data output 121 and the data storage (B) data output enable 122, output from the data storage (B)2, and creates the ES data detection signal 191 in the PES from them.

Referring to FIGS. 10 and 11, activation of any one of the PES header detection signal 151 in the TS header, the PES header detection signal 161 in the PS header and the PES header detection signal 181 in the PES header is waited in the state S101. When any one of those signals is activated, the flow goes to the state S102.

At this time, when transition occurs by activation of the PES header detection signal 151 in the TS header, the TS header flag (means (not shown)) saves the state. At this time, the data Exh (where x is 0h to Fh) is input. X section is called Stream ID and represents the type of stream. When the Stream ID is saved and the flow changes from the state S101 to the state S102 in the following steps, the previously saved Stream ID is compared with the current Stream ID. If the comparison indicates no coincidence, the flow goes to the state S102. Thus, data in which Video ES is multiplexed can be processed in the PES layer.

Either the PES header detection signal 151 in the TS header or the PES header detection signal 161 in the PS header is in active state is confirmed in the state S102. When neither is in an active, it is when only the PES header detection signal 181 in the PES header is in an active state, the flow goes to the state S115.

The inputting of 2-byte data is waited in the state S103 and the content is saved as PES Packet Length. The flow goes to the state S104. In the states S103 to S106, the TS header flag judges the inputting of data with a different timing.

When the PES header detection signal 151 in the TS header indicates an active state, the TS header flag recognizes, as the inputting of data, activation of both the data storage (B) data output enable 122 and the TS data detection signal 152. When the PES header detection signal 151 in the TS header does not indicate an active state, the TS header flag recognizes, as the inputting of data, activation of the data storage (B) data output enable 122.

The inputting of 2-byte data is waited in the state S104. The flow goes to the state S105. The inputting of data is waited in the state S105 and the data is save as PES Header Length. The flow goes to the state S106. The inputting of data corresponding to PES Header Length is waited in the state S106. Thus, the flow goes to the state S107.

Whether or not PES Packet Length saved in the state S103 is 0 is judged in the state S107. When PES Packet Length is 0, the flow goes to the state S111. When PES Packet Length is not 0, the flow goes to the state S108.

The inputting of data is waited in the state S108. The flow goes to the state S109. The ES data detection signal 191 in the PES is activated in the sate S109. This means that data for one byte input in the state S108 activates the ES data detection signal 191 in the PES, with the timing in which the data storage (C) data output 131 is output and in synchronous with the data storage (C) data output enable 132. Thereafter, the flow goes to the state S110.

Whether or not data corresponding to PES Packet Length has been input is confirmed in the state S110. When data corresponding to PES Packet Length is input, the flow goes to the state S101. When data corresponding to PES Packet Length is not input, the flow goes to the state S108. At this time, the number of data sets processed in the states S104 to S106 contained in the PES Packet Length is subtracted. Thus, the inputting of data is waited.

The inputting of data is waited in the state S111. The flow goes to the state S112. When the PES header detection signal 151 in the TS header or the PES header detection signal 161 in the PS header is in an active state in the state S112, the flow goes to the state S103.

When the PES header detection signal 161 is not in an active state, the flow goes to the state S113. At this time, when transition occurs due to the PES header detection signal 151 in the TS header in an active state, the TS header flag (means (not shown)) saves the state.

Whether or not the TS data detection signal 152 is in an active state is confirmed in the state S113. When the TS data detection signal 152 is in an active state, the flow goes to the state S114. When the TS data detection signal 152 is not in an active state, the flow goes to the state S111.

The ES data detection signal 191 in the PES is activated in the state S114. This means that data for one byte input in the state S111 activates the ES data detection signal 191 in the PES, with the timing in which the data storage (C) data output 131 and in synchronous with the data storage (C) data output enable 32. Thereafter, the flow goes to the state S111.

The inputting of data is waited in the state S115 and the content is saved as PES Packet Length. The flow goes to the state S116. The inputting of data is waited in the state S116. The flow goes to the state S117. The inputting of data is waited in the state S117. The data is saved as PES Packet Length. The flow goes to the state S118.

The inputting of data corresponding to PES Header Length is waited in the state S118. The flow goes to the state S119. Whether or not PES Packet Length saved in the state S115 is 0 is judged in the state S119. When the PES Packet Length is 0, the flow goes to the state S101. When the PES packet Length is not 0, the flow goes to the sate S120.

The inputting of data is waited in the state S120. The flow goes to the state S121. When either the PES header detection signal 151 in the TS header or the PES header detection signal 161 in the PS header is in an active state, the flow goes to the state S103. When one of the detection signals 151 and 161 is not an active state, the flow goes to the state S122.

The ES data detection signal 191 in the PES is activated in the state S122. This means that data input for one byte input in the state S120 activates the ES data detection signal in the PES, with timing in which the data storage (C) data output 131 is output and in synchronous with the data storage (C) data output enable 132. Thereafter, the flow goes to the state S123.

Whether or not data corresponding to PES Packet Length has been input is confirmed in the state S123. When data corresponding to the PES Packet Length is input, the flow goes to the state S101. When data corresponding to the PES Packet Length is not input, the flow goes to the state S120. At this time, the PES packet Length contains the number of data sets processed in the states S116 to S118. Then, the branch is taken by subtracting the number of data sets.

This method enables extracting V-ES from PES. However, the method is not processed in the PES in which the PES Packet Length indicates 0.

Figure 12:
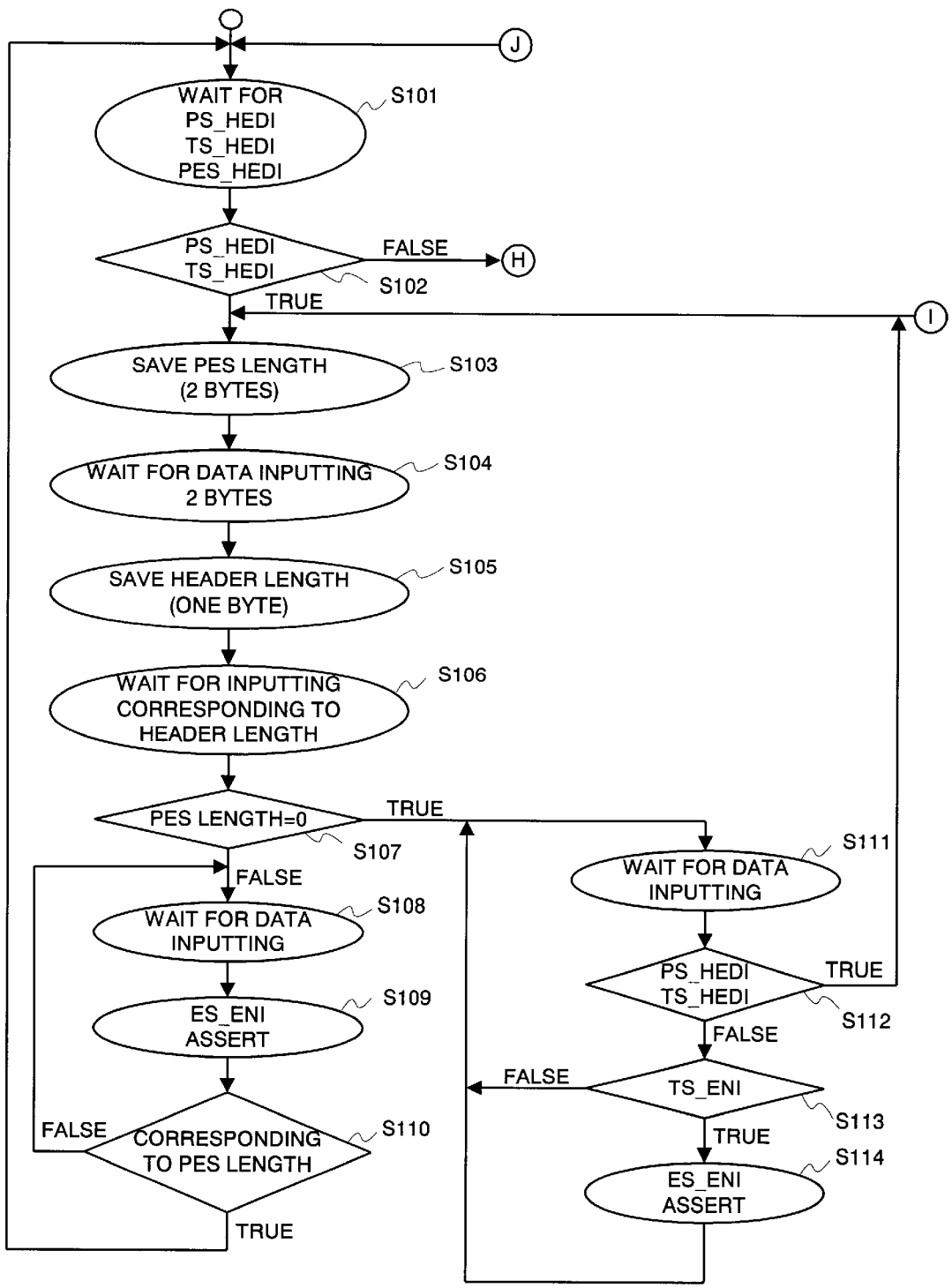
FIG. 12 is a flowchart of the internal operation of the PES data processor according to another embodiment and FIG. 13 is a flowchart of the internal operation of the PES data processor according to another embodiment.
Figure 13:
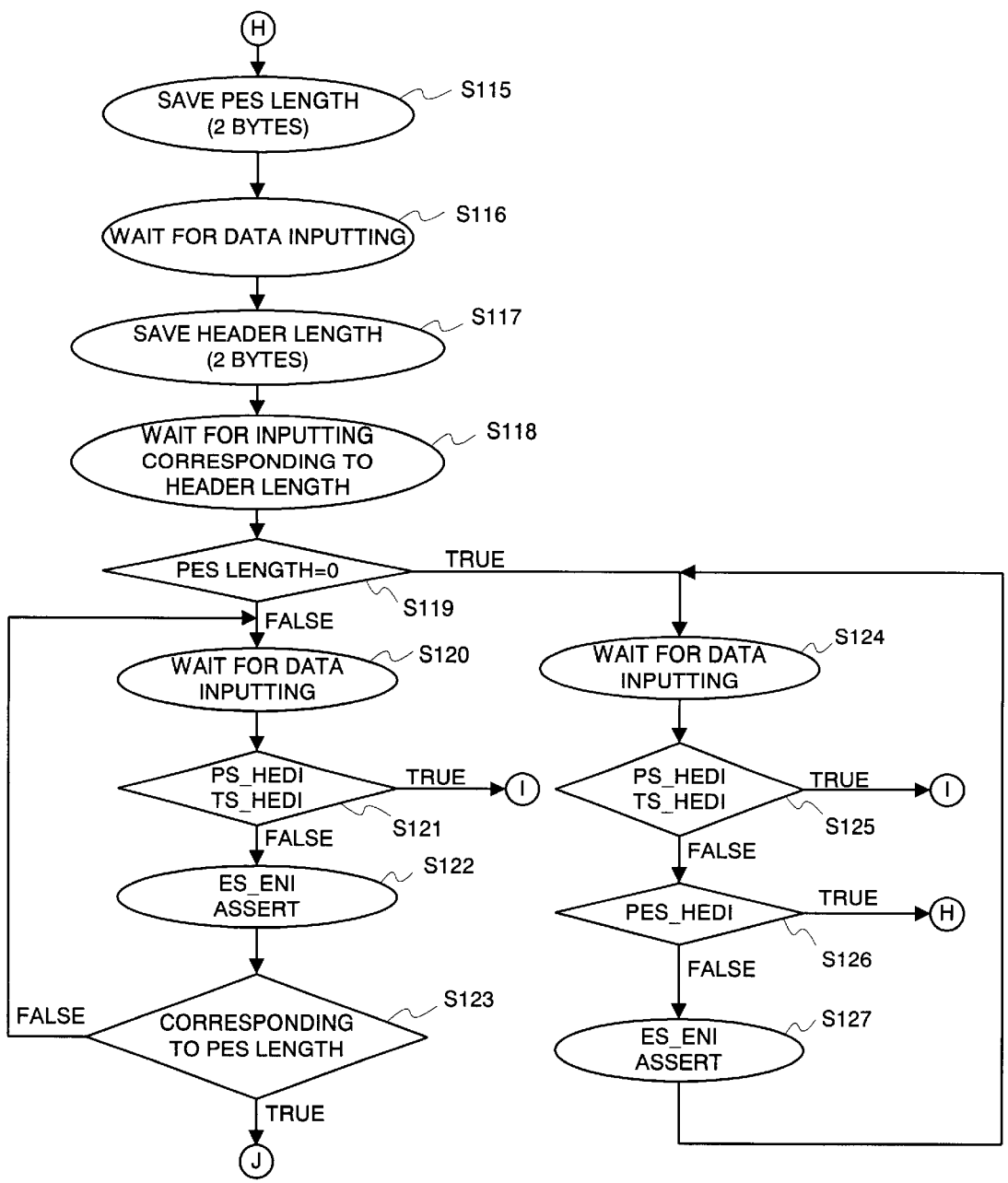

FIGS. 12 and 13 are flowcharts of the internal operation of the PES data processor 9 according to another embodiment of the present invention. Referring to FIGS. 12 and 13, this embodiment differs from the embodiments shown in FIGS. 10 and 11 in that the states S124 to S127 are added.

Each of FIGS. 12 and 13 shows a PES processing method showing PES Packet Length of 0, according to another embodiment of the present invention. However, this method cannot accurately extract an elementary stream. The reason is that the ES data detection signal 191 in the PES is activated at the leading portion of the second or successive PES packet, with 3 bytes including 00h, 00h and 01h.

Hence, the circuit (not shown) that does not activate the ES data detection signal 191 in the PES with the same data has to be inserted at the rear stage of the PES data processor 9 in the configuration shown in FIG. 8. The difference between the above-mentioned embodiment and the other embodiments of the present invention will be described below.

Referring to FIGS. 12 and 13, whether or not the PES Packet Length saved in the state S115 is 0 is judged in the state S119. When the PES Packet Length is 0, the flow goes to the state S124. When the PES Packet Length is not 0, the flow goes to the state S120.

The inputting of the state S124 is waited in the state S124. The flow goes to the state S125. When the PES header detection signal 151 in the TS header or the PES header detection signal 161 in the PS header is in an active state in the state S125, the flow goes to the state S103. When any one of the PES header detection signals 151 and 161 is not in an active state, the flow goes to the state S126. At this time, when transaction occurs due to activation of the PES header detection signal 151 in the TS header, the TS header flag (means (not shown)) saves the state.

Whether or not the PES header detection signal 181 in the PES is in an active state is confirmed in the state S126. When the PES header detection signal 181 is in an active state, the flow goes to the state S115. When the PES header detection signal 181 is not in an active state, the flow goes to the state S127.

The ES data detection signal 191 in the PES is activated in the state S127. This means that data for one byte input in the state S124 activates the ES data detection signal 191 in the PES, with timing in which the data storage (C) data output 131 is output and in synchronous with the data storage (C) data output enable 132. Thereafter, the flow goes to the state S124.

As described above, in a MPEG video elementary stream extractor of the present invention, an elementary stream, or data, is extracted from a program stream or a transport stream. The program stream complies with the scheme of multiplexing one program into basic packets and then transmitting the basic packets in a time division mode. The transport stream complies with a multiplex/separation scheme compatible with a multi-program. The executor further includes decider for deciding that a stream is the program stream or the transport stream, and means for allowing the elementary stream to be extracted based on decision result of the decider. Thus, the original stream structure can be easily reproduced by extracting a video stream and then by once changing part of the video stream data.

What is claimed is:

1. A MPEG (Moving Picture Experts Group) video elementary stream extractor, wherein an elementary stream, or data, is extracted from a program stream or a transport stream, said program stream complying with the scheme of multiplexing one program into basic packets and then transmitting the basic packets in a time division mode, said transport stream complying with a multiplex/separation scheme compatible with a multi-program, comprising:

a decider for deciding that an input stream is said program stream or said transport stream; and means for allowing said elementary stream to be extracted based on a decision result of said decider.

2. The MPEG video elementary stream extractor defined in claim 1, wherein said decider comprises:

means for detecting PID (Packet Identification) containing said elementary stream; and means for detecting positional information of a leading synchronous byte of said transport stream.

3. A MPEG (Moving Picture Experts Group) video elementary stream extractor, wherein an elementary stream, or data, is extracted from a program stream or a transport stream, said program stream complying with the scheme of multiplexing one program into basic packets and then transmitting the basic packets in a time division mode, said transport stream complying with a multiplex/separation scheme compatible with a multi-program, comprising:

a decider for deciding that an input stream is said program stream or said transport stream;

means for allowing said elementary stream to be extracted based on a decision result of said decider; and means for outputting said input stream with a delay of three clocks at all times; and wherein said means for allowing said elementary stream to be extracted notifies, when said elementary stream is output with a delay of three clocks, an outside world of the state, whereby said elementary stream can be extracted.

4. The MPEG video elementary stream extractor defined in claim 3, wherein, when said input stream is output without any change, a signal representing whether or not data being currently output is said elementary stream or a stream other than said elementary stream is added to said stream and the state is notified an outside world.

5. A MPEG (Moving Picture Experts Group) video elementary stream extractor, wherein an elementary stream, or data, is extracted from a program stream or a transport stream, said program stream complying with the scheme of multiplexing one program into basic packets and then transmitting the basic packets in a time division mode, said transport stream complying with a multiplex/separation scheme compatible with a multi-program, comprising:

means for detecting PID (Packet Identification) containing said elementary stream;

means for detecting positional information of a leading synchronous byte of said transport stream;

means for extracting elementary stream based on said detected result, outputting said input stream with a delay of three clocks at all times and notifying, when said elementary stream is output with a delay of three clocks, an outside world of the state.

6. The MPEG video elementary stream extractor defined in claim 5, wherein, when said input stream is output without any change, a signal representing whether or not data being currently output is said elementary stream or a stream other than said elementary stream is added to said stream and the state is notified an outside world.

7. A MPEG (Moving Picture Experts Group) video elementary stream extracting method, wherein an elementary stream, or data, is extracted from a program stream or a transport stream, said program stream complying with the scheme of multiplexing one program into basic packets and then transmitting the basic packets in a time division mode, said transport stream complying with a multiplex/separation scheme compatible with a multi-program, the method comprising the steps of:

deciding that a stream is said program stream or said transport stream; and a step for allowing said elementary stream to be extracted based on a decision result.

8. The elementary stream extracting method defined in claim 7, wherein said decider comprises the steps of:

detecting a PID (Packet Identificaiton) containing said elementary stream; and detecting positional information of a leading synchronous byte of said transport stream.

9. A MPEG (Moving Picture Experts Group) video elementary stream extracting method, wherein an elementary stream, or data, is extracted from a program stream or a transport stream, said program stream complying with the scheme of multiplexing one program into basic packets and then transmitting the basic packets in a time division mode, said transport stream complying with a multiplex/separation scheme compatible with a multi-program, the method comprising the steps of:

deciding that a stream is said program stream or said transport stream; and allowing said elementary stream to be extracted based on a decision result;

outputting said stream with a delay of three clocks at all times; and wherein said step of allowing said elementary stream to be extracted comprises the step of notifying, when said elementary stream is output with a delay of three clocks, an outside world of the state, so that said elementary stream can be extracted.

10. The elementary stream extracting method defined in claim 9, further comprising the step of adding, when said stream is output without any change, a signal representing whether or not data being currently output is said elementary stream or a stream other than said elementary stream, and notifying an outside world of the state.

* * * * *